(12) United States Patent
Copeland

(10) Patent No.: US 10,107,434 B1
(45) Date of Patent: Oct. 23, 2018

(54) HIGH DEFLECTION RESTRAINED PIPE JOINT

(71) Applicant: McWane, Inc., Birmingham, AL (US)

(72) Inventor: Daniel A. Copeland, Bessemer, AL (US)

(73) Assignee: McWane, Inc., Birmingham, AL (US)

( * ) Notice: Subject to any disclaimer, the term of this patent is extended or adjusted under 35 U.S.C. 154(b) by 538 days.

(21) Appl. No.: 14/873,447

(22) Filed: Oct. 2, 2015

(51) Int. Cl.
*F16L 37/12* (2006.01)
*F16L 21/03* (2006.01)
*F16L 37/53* (2006.01)
*F16L 21/08* (2006.01)

(52) U.S. Cl.
CPC ............... *F16L 37/12* (2013.01); *F16L 21/03* (2013.01); *F16L 21/08* (2013.01); *F16L 37/53* (2013.01)

(58) Field of Classification Search
CPC ....... F16L 21/025; F16L 21/03; F16L 21/035; F16L 27/1021; F16L 27/1017; F16L 21/02
See application file for complete search history.

(56) References Cited

U.S. PATENT DOCUMENTS

| 9,851,029 B2 * | 12/2017 | Jones | F16L 17/035 |
| 2010/0090460 A1 * | 4/2010 | Vitel | F16L 17/035 |
| | | | 285/306 |
| 2013/0043656 A1 * | 2/2013 | Copeland | F16L 37/0845 |
| | | | 277/314 |

FOREIGN PATENT DOCUMENTS

FR 2966554 A1 * 4/2012 .......... F16L 37/0845

* cited by examiner

*Primary Examiner* — David Bochna
*Assistant Examiner* — James A Linford
(74) *Attorney, Agent, or Firm* — C. Brandon Browning; Maynard, Cooper & Gale, PC

(57) ABSTRACT

A restrained pipe joint with improved deflection including a first pipe having a bell socket end, a second pipe having a spigot end inserted into and pivotable within the bell socket, a pivot plane, a sealing plane and an impingement plane, each of the sealing plane and the impingement plane being spaced a desired distance from the pivot plane, the desired distance being less than 15% of the outer diameter of the spigot end.

12 Claims, 4 Drawing Sheets

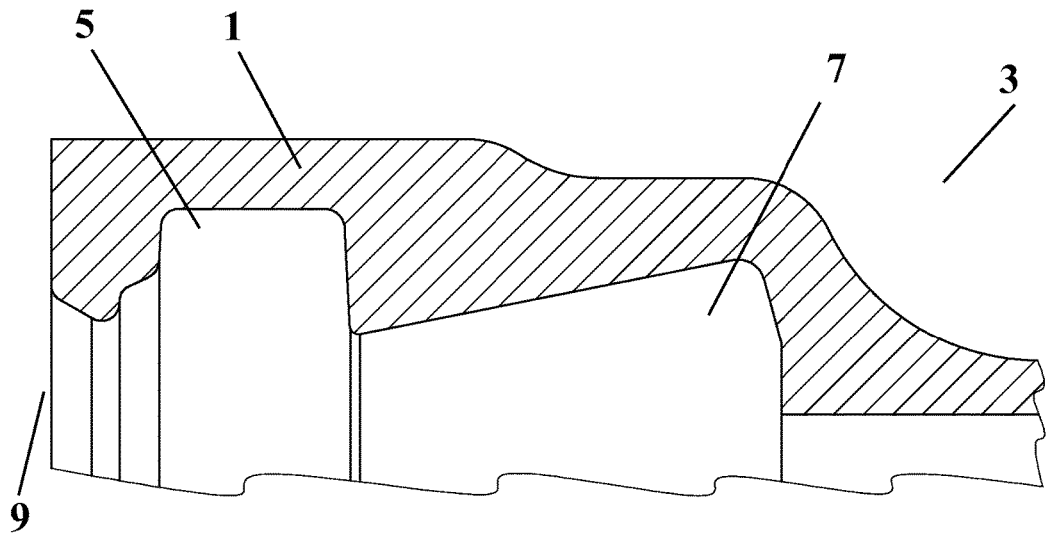
*FIG. 1*
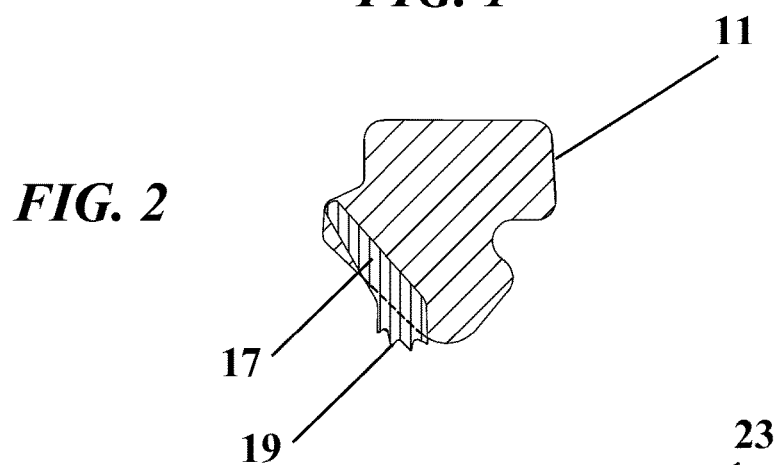
*FIG. 2*
*FIG. 3*
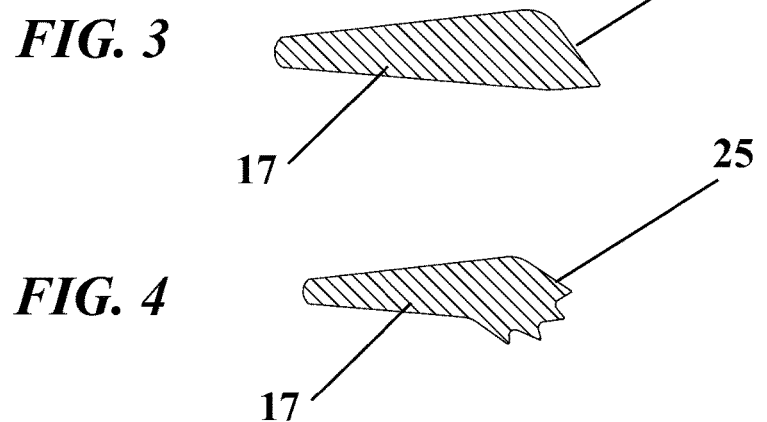
*FIG. 4*

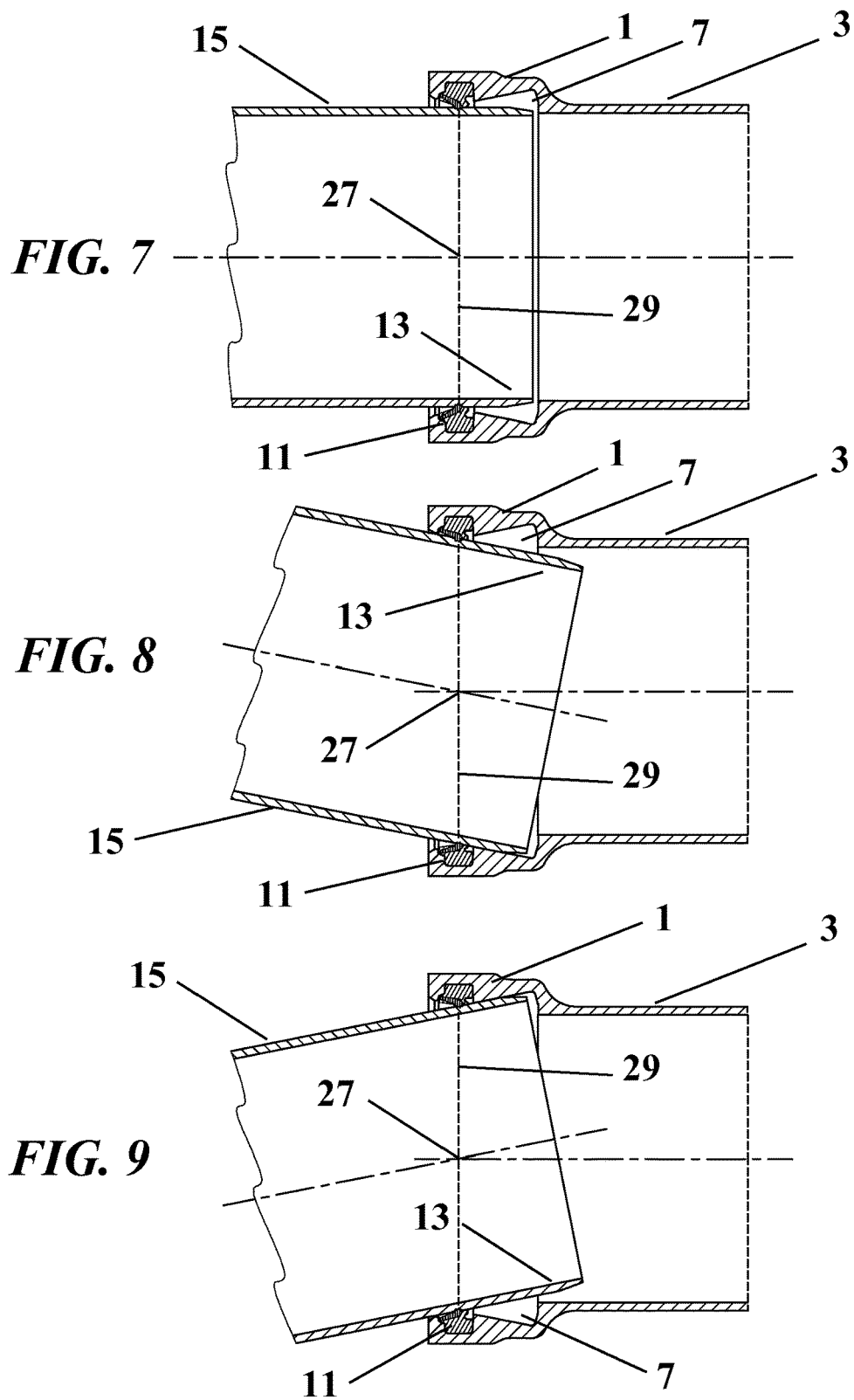

HIGH DEFLECTION RESTRAINED PIPE JOINT

FIELD OF INVENTION

The present invention relates generally to a restrained pipe joint, and more particularly, to a pipe joint including a spigot end of a second pipe that is angularly deflectable within a bell socket end of a first pipe about a pivot point that has a specified positional relationship with an annular seal of the bell socket end.

BACKGROUND OF THE INVENTION

Telescopically assembled pipes are used in numerous applications. In short, the spigot end of one pipe is inserted into the socket end of a second pipe. The opening of the socket end of tone pipe is configured to receive the spigot end of another pipe, which becomes partially enclosed by the first pipe. A sealing member, such as a gasket may be inserted in the socket end to enhance the seal between the two pipes. Locking segments circumferentially arranged in the gasket restrain the resulting joint by impinging upon the spigot end thereby prevent separation of the pipes.

Telescopically assembled pipe joints that include tight seals, which also allow for high deflection (pivot) angles, however, remain a challenge for conventional pipe manufacturers. The cost and bulk of a typical joint required to achieve such unrestrained, high deflection pipe angles remains burdensome or necessitates the use of a separate pipe fitting between the two pipes. Ball and socket joints, for example, must be machined within close tolerances and are relatively expensive to produce. Typical telescopically assembled joints require large bulky bells and sealing members to accommodate even moderate deflections. Therefore, a need exists for a low cost, high deflection, low weight, restrained pipe joint.

SUMMARY OF INVENTION

The present disclosure is directed to an improved pipe joining system including a first pipe having a bell or socket end and a second pipe having a male or spigot end, the pipes configured to form an restrained, push-fit, ring-seal assembly when operatively joined, the joined pipes capable of a high deflection angle.

The present disclosure is also directed to an improved pipe joining system using lightweight components relative to those of conventional pipe joints.

The present disclosure is also directed to an improved pipe joining system that is simply to manufacture relative to conventional pipe joints.

The present disclosure is also directed to an improved pipe joining system configured to maintain an airtight and watertight seal. The present disclosure is also directed to an improved pipe joining system configured to maintain an airtight and watertight seal while the interior of such pipes are under high pressure.

The present disclosure is further directed to a method of joining two pipes wherein the spigot end of a second pipe is inserted into the bell socket end of a first pipe, the bell socket including a groove containing a sealing member, the bell socket further including a pivot cavity configured to allow a high deflection angle for the two pipes.

The present disclosure is further directed to a pipe joint formed by a first pipe having a longitudinal axis and a bell end including an annular groove. Seated within the annular groove is an annular compressible member having an inner face defining an opening. Circumferentially arranged and at least partially embedded within the annular compressible member are a plurality of locking segments having one or more acutely pointed teeth that extend radially inward through the inner face of the compressible member. A spigot end of a second pipe is inserted into the bell end and through the opening thereby forming an annular seal between the annular compressible member and the spigot end, the annular seal having an axially extending width. A pivot point about which the second pipe pivots relative to the first pipe is formed by joining the first and second pipe. The pivot point is coincident with a pivot plane extending perpendicularly through the longitudinal axis of the first pipe and through the annular compressible member. A sealing plane is also formed that extends perpendicularly through the longitudinal axis of the first pipe at a second point and through a center of the width of the annular seal, the second point being a desired distance from the pivot point. The desired distance may be 0% to 15%; 0% to 0.5%; 0.5% to 14%; 0.75% to 13%; 1% to 12%; 1.25% to 11%; 1.5% to 10%; 2% to 9%; 2.25% to 8%; 2.5% to 7%; 3% to 6; or 4% to 5% of the outer diameter of the spigot end.

Upon initial pressurization of the pipe joint, the plurality of locking segments impinges upon the spigot end as pressurization of the pipes attempts to force the pipes apart. A ring of impingement points is thereby formed about the exterior of the spigot end of the second pipe by the engagement of teeth of the locking segments with the exterior of the spigot end. Additionally, an impingement plane is formed that extends perpendicularly through the longitudinal axis of the first pipe at a third point and through one or more of the impingement points, the third point being a desired distance from the pivot point. The desired distance may be 0% to 15%; 0% to 0.5%; 0.5% to 14%; 0.75% to 13%; 1% to 12%; 1.25% to 11%; 1.5% to 10%; 2% to 9%; 2.25% to 8%; 2.5% to 7%; 3% to 6; or 4% to 5% of the outer diameter of the spigot end.

Other objects, features and advantages of the present disclosure will become apparent from the following detailed description given with reference to the accompanying figures.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1 depicts a portion of the cross-section of an exemplary female bell socket of a pipe.

FIG. 2 depicts a cross-section of a pipe sealing member with a foot portion containing an embedded, toothed restraint.

FIG. 3 depicts an exemplary pipe restraint with a single tooth.

FIG. 4 depicts an exemplary pipe restraint with multiple teeth.

FIG. 7 depicts the spigot end of a second pipe fitted into the bell socket end of a first pipe, the pipes secured by a sealing member fitted within the bell socket with the pipes further secured by toothed restraints embedded in the inner surface of the sealing member, wherein the two pipes are parallel.

FIG. 8 depicts the spigot end of a second pipe fitted into the bell socket end of a first pipe, the pipes secured by a sealing member fitted within the bell socket with the pipes further secured by toothed restraints embedded in the inner surface of the sealing member, wherein the second pipe is pivoted at an angle relative to the first pipe.

FIG. 9 depicts the spigot end of a second pipe fitted into the bell socket end of a first pipe, the pipes secured by a sealing member fitted within the bell socket with the pipes further secured by toothed restraints embedded in the inner surface of the sealing member, wherein the second pipe is pivoted at a different angle relative to the first pipe.

DETAILED DESCRIPTION

Figure 5:
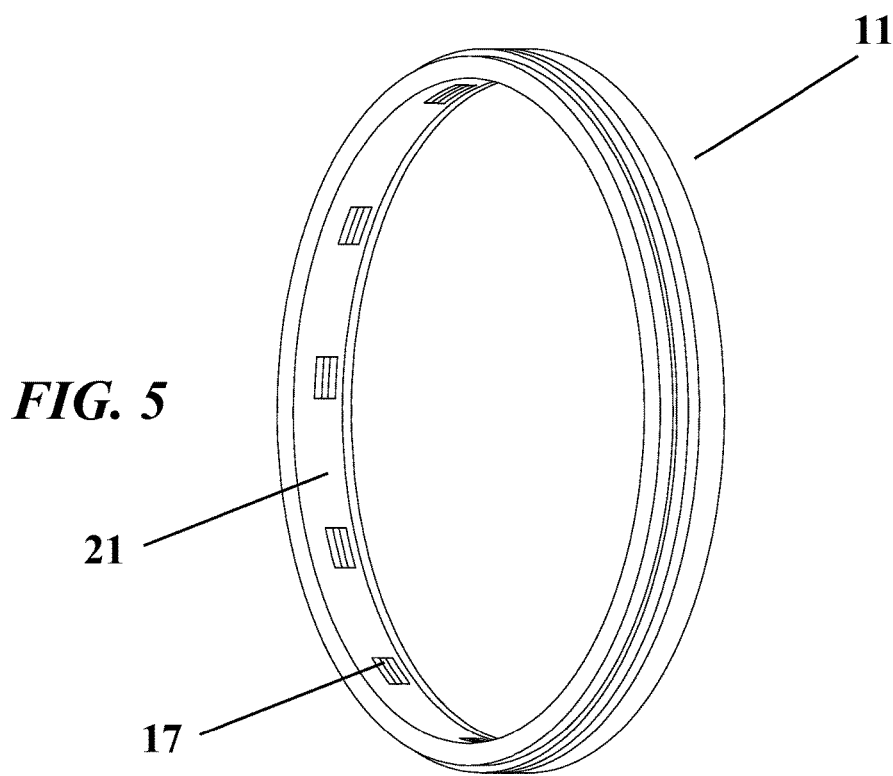
FIG. 5 depicts an exemplary pipe sealing member with multiple-toothed restraints embedded on the inner surface of the sealing member.

The present disclosure generally pertains to systems and methods for an improved pipe joint. The system includes a first pipe having a bell socket end and a second pipe having a male or spigot end. The bell socket end of the first pipe is configured to include an inner groove within which a sealing member, which includes embedded restraints evenly spaced apart on along its inner surface, may be inserted. The bell socket end of the first pipe further includes a pivot cavity. The spigot end of the second pipe may be inserted into bell socket end of the first pipe to form a restrained, push-fit, ring-seal assembly when operatively joined. The circumferential sealing area formed by the sealing member's interaction with the spigot of the second pipe defines a sealing plane that is longitudinally located in relatively close proximity with a pivot plane and an impingement plane of the two pipes, thereby allowing a high deflection angle with a relatively low bell and sealing member mass.

The use of any and all examples, or exemplary language ("e.g.," "such as," or the like) provided herein, is intended merely to better illuminate the embodiments and does not pose a limitation on the scope of the embodiments.

As used herein, "alloy" means pure metals and metals including incidental impurities and/or purposeful additions of metals and/or non-metals. For example, alloy may mean aluminum. Other examples of alloys include brass, bronze, copper, duralumin, Inconel, nickel, steel, stainless steel, titanium, other alloys known to those skilled in the art, and combinations of the same.

As used herein, "composite" means engineered materials made from two more constituent materials. Examples of composites include, but are not limited to, carbon composites, in which carbon fiber is embedded in a matrix or resin, including epoxy matrices, thermosetting or thermoplastic resins, as well as composites containing fiberglass and other like materials known in the art.

As used herein, "pivot point" refers to a point where the centerline axis of a pipe intersects the centerline axis of another pipe as viewed in a two dimensional cross section view of a deflected pipe joint assembly. In three dimensions, the pivot point is a line unless the pipes are arranged perfectly concentric.

As used herein, "plastic" means a thermoplastic, a thermoset plastic, polyvinyl chloride or other extruded high molecular mass, organic polymer, and other plastics known in the art.

As used herein, "rubber" means any natural, cured, reclaimed, vulcanized and synthetic elastomers including, but not limited to, acrylic rubber, acrylonitrile butadiene rubber (nitrile or NBR), butyl rubber (IIR), ethylene propylene diene monomer (EPDM), fluoroelastomer rubber, hydrogenated nitrile rubber, styrene-butadiene rubber (SBR), silicone, and like flexible materials known in the art having elastic memory.

As used herein, "throat" refers to the smallest annular opening within a bell socket of a pipe that will allow the spigot of another pipe to enter the bell socket. In a conventional pipe joint the throat is formed by the inner surface of the bell socket which generally defines or is radially aligned with the axial location of the pivot point. In the present invention, the throat is formed by or essentially aligned with an elastomeric sealing member.

Throughout the accompanying drawings, identical or similar parts are represented by the same reference numerals and characters.

FIG. 1 depicts a female bell socket end 1 of a pipe 3. The bell socket 1 includes a groove spanning the inner circumference of the bell socket end 1 which forms a sealing surface 5 configured to accept a sealing member 11 such that the sealing surface 5 is complementary to the shape of the outer surface of the sealing member 11. As used herein, "sealing surface" 5 means a cavity or groove on the interior surface of the bell socket 1 configured to accept a sealing member 11 and to resist lateral movement of such sealing member 11. For example, the sealing surface 5 groove depicted in FIG. 1 is designed to accept the sealing member 11 depicted in FIG. 2 such that the outer surface of the sealing member 11 is in contact with the surface of the sealing surface 5. The sealing member 11 enhances the seal between the first pipe 3 and the second pipe 15 such that the seal is maintained regardless of the deflection angle at which the two pipes are positioned.

Figure 6:
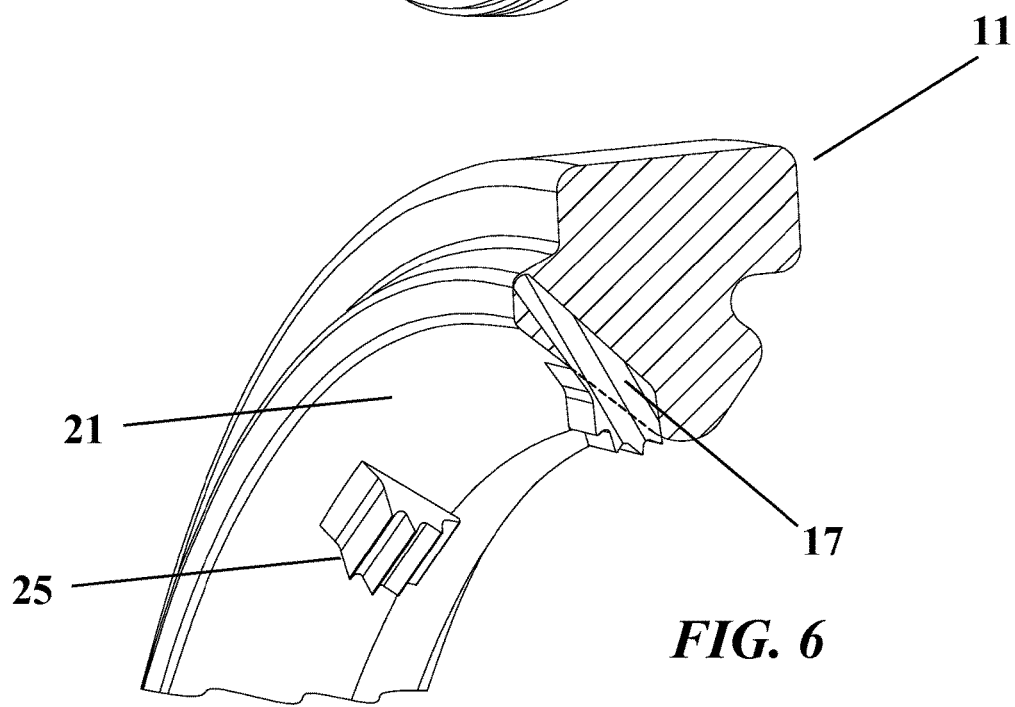
FIG. 6 depicts a cutaway of an exemplary pipe sealing member with a foot portion containing multiple embedded, multiple-toothed restraints.

The bell socket 1 further includes a second groove which spans the inner circumference of the bell socket end 1 and forms pivot cavity 7, which is configured to allow the spigot end 13 of an inserted pipe 15 to pivot. The ability of the pipe 15 to pivot within the pivot cavity 7, for example, is depicted in FIGS. 7, 8 and 9. In certain embodiments, the inner surface of the pivot cavity 7 distal from the sealing surface 5 is concave relative to the interior of the first pipe 3 to allow the spigot end 13 of the second pipe 15 to pivot within the pivot cavity 7, such as is depicted in FIGS. 6, 7, and 8. In certain embodiments, the spigot end 13 of the pipe 15 is tapered such that the outer diameter of the pipe 15 decreases toward the spigot end 13. The pivot cavity 7 is located on the side of the sealing surface 5 that is distal from the bell socket end 1 aperture, and the depth of the pivot cavity 7 increases linearly with its distance from the sealing surface 5 such that the pivot cavity 7 is generally conical in shape. In other words, the depth of the pivot cavity 7 is greatest at the point of the pivot cavity 7 furthest from the sealing surface 5. The depth of the pivot cavity 7 may be adjusted in different embodiments to allow for different pivot, or deflection angles, between the first pipe 3 and the second pipe 15. For example, increasing the depth of the pivot cavity 7 will enable a greater deflection angle between the first pipe 3 and the second pipe 15. The conical shape of the pivot cavity 7 permits deflection of the first pipe 3 in any direction relative to the longitudinal axis of the second pipe 15.

In certain embodiments, the first pipe 3 and/or the second pipe 15 are generally cylindrical. In certain embodiments, the bell socket end 1 of the first pipe 3 is generally cylindrical. In other embodiments, the spigot end 13 of the second pipe 15 is generally cylindrical. In certain embodiments, the outer diameter of the spigot end 13 of the second pipe 15 is greater than the inner diameter of the first pipe 3, but less than the inner diameter of the bell socket end 1 of the first pipe 3. For example, the spigot end 13 of the second pipe 15 may be inserted into, but not beyond, the bell socket end 1 of the first pipe 3 as a result of the differential circumferences of the two pipes. This insertion limitation may serve as an indicator of proper insertion of the second pipe 15 into the first pipe 3. In certain embodiments, the first pipe 3 and/or the second pipe 15 are composed of an alloy. In other embodiments, the first pipe 3 and/or the second pipe 15 are composed of a composite. In certain embodiments, the first pipe 3 and/or the second pipe 15 are composed of plastic.

FIG. 5 depicts an exemplary embodiment of a ring-shaped sealing member 11. In certain embodiments, the sealing member 11 is compressible. In certain embodiments, the sealing member 11 is elastomeric. In certain embodiments, the sealing member 11 is composed of rubber. The sealing member 11 includes a foot portion including a plurality of toothed-restraints 17 evenly and circumferentially spaced and embedded within the contact surface 21 of the sealing member 11 such that a, acutely pointed, toothed portion 19 of the restraint 17 protrudes from the sealing member 11, such as is depicted in the cross-section shown in FIGS. 2 and 5. In certain embodiments, the foot portion including the contact surface 21 is less compressible than the remainder of the sealing member 11. The number of toothed-restraints 17 in a sealing member 11 may be adjusted depending on the internal pressurization of the pipes. For example, higher pressurized pipes may require more toothed-restraints 17 than lower pressurized pipes.

In certain embodiments, the toothed portion 19 of the restraint 17 extends radially inward toward the longitudinal center of the sealing member 11. In certain embodiments, the foot portion with the contact surface 21 of the sealing member 11 extends radially inward toward the longitudinal center of the sealing member 11. As used herein, "contact surface" 21 means the inner surface of the sealing member 11 which makes contact with the outer surface of the spigot end 13 of the male pipe 15. The point on the spigot end 13 of the male pipe 15 at which the restraints 17 make contact is referred to herein as the "impingement point."

In certain embodiments, each restraint 17 has one tooth 23, such as is depicted in FIG. 3. In other embodiments, each restraint 17 has multiple teeth 25. For example, in certain embodiments, the restraint 17 may have four teeth, such as is depicted in FIG. 4. The restraints 17 and the contact surface 21 are configured such that, once engaged with the outer surface of the spigot end 13 of a pipe 15, they resist or impinge the withdrawal of such pipe 15. For example, the teeth of the toothed portion 19 of the restraint 17 and the foot portion with the contact surface 21 may be angled away from the opening 9 of the socket end 1 of the first pipe 3 such that the resistance the restraint 17 and the contact surface 21 impart upon the second pipe 15 is significantly greater when the second pipe 15 is withdrawn from, compared to when the second pipe 15 is inserted into, the first pipe 3. This greater resistance is caused not only by the point ends of each tooth of the toothed portion 17 being directed into the surface of the second pipe 15, but also from the compression of the sealing member 11 caused by such withdrawal of the second pipe 15. In certain embodiments, the restraints 17 are composed of an alloy. In certain embodiments, the restraints 17 are composed of a composite.

An annular channel 22 is provided on a radial edge of the sealing member. The annular channel 22 provides a space into which sealing member 11 can occupy when the second pipe 15 compresses sealing member 11 upon initial entry into the bell socket 1. The annular channel 22 thereby decreases the amount of force required to push the second pipe 15 into the bell socket 1 and through sealing member 11.

Referring to the pipe joint of FIGS. 7, 8 and 9, the contact surface 21 of sealing member 11 and the pivot point 27 of the two pipes are positioned within an annular band defined by the engagement of the compressible membrane 11 with the outer surface of the second pipe 15, such as is depicted in FIGS. 6, 7, and 8. The width of the longitudinal band is limited to the extent required to enable the second pipe 15 to pivot about the pivot point 27 such that the spigot end 13 of the second pipe 15 may pivot within the pivot cavity 7 within the socket end 1 of the first pipe 3. The width of the annular band along its length may be vary and is subject to change upon pivoting of the second pipe 15 within the bell socket 1 since pivoting of the second pipe 15 causes the compressible member to compress, thereby increasing the width of the band in the areas of compression, and decompress, thereby decreasing the width of the band in the areas of decompression. In certain embodiments, the first pipe 3 and second pipe 15 may pivot relative to one another in any direction, the angle of deflection limited by the width of the longitudinal band and the depth and angle of the pivot cavity 7. In certain embodiments, the maximum deflection angle of the pipe joint formed by the first pipe 3 and second pipe 15 is about 11.25 degrees. In certain embodiments, longitudinal width of the pipe joint formed by the two pipes is about 4 to 12 inches.

In certain embodiments, the pivot point 27 may be radially aligned with the sealing surface 5 and/or the sealing member 11. In certain embodiments, inner diameter of the throat is greater than an inner diameter of the sealing member 11. In certain embodiments, the contact surface 21 impinges against the second pipe 15 at a sealing point.

The present disclosure further contemplates a method of forming a pipe joint including the steps of: providing a first pipe 3 having a bell socket end 1, the bell socket end 1 including an annular groove forming a sealing surface 5 and a sealing member 11 located within the sealing surface 5, the sealing member 11 including a contact surface 21 extending radially inward, and a pivot groove configured to allow the pivoting of the spigot end 13 of a second pipe 15; positioning the first pipe 3 coaxially adjacent to the second pipe 15; inserting a spigot end 13 of a second pipe 15 through the opening 9 of the socket end 1, and the opening of the sealing member 11, of the first pipe 3; compressing the sealing member 11 between the sealing surface 5 and the spigot end 13 to produce a compressed sealing member 11 having an inner diameter; impinging the contact surface 21 against the outer surface of the second pipe 15; and pivoting the spigot end 13 within the bell end 1 about a pivot point 27 that is radially aligned with the sealing surface 5. FIGS. 7, 8 and 9, for example, illustrate the pivoting range of an exemplary pipe joint.

The resulting pipe joint includes pivot point 27 about which the second pipe 15 pivots relative to the first pipe 3.

The pivot point 27 is coincident with a pivot plane 29 extending perpendicularly through a longitudinal axis 30 of the first pipe 3 and through the annular compressible member 11. A sealing plane 31 is also formed that extends perpendicularly through the longitudinal axis 30 of the first pipe 3 at a second point 33 and through a center of a width of the annular seal 51 (see FIG. 10) formed and defined by the engagement of the sealing member 11 with the outer surface of the second pipe 15, the second point 33 being a desired distance from the pivot point 27 of 0% to 15% of the outer diameter of the spigot end. It is anticipated that annular seal may not be circular, for example, resulting from the pivoting of the second pipe 15 and deformation of compressible member 11. Thus, annular seal may have different widths along its continuous length and may curve both proximally and distally about second pipe 15 such that the annular seal appears as a wavy, continuous line of varying widths. For purposes of the invention, the center of the width of the annular seal is defined by and between the distal most boundary and the proximal most boundary of the annular seal.

Figure 10:
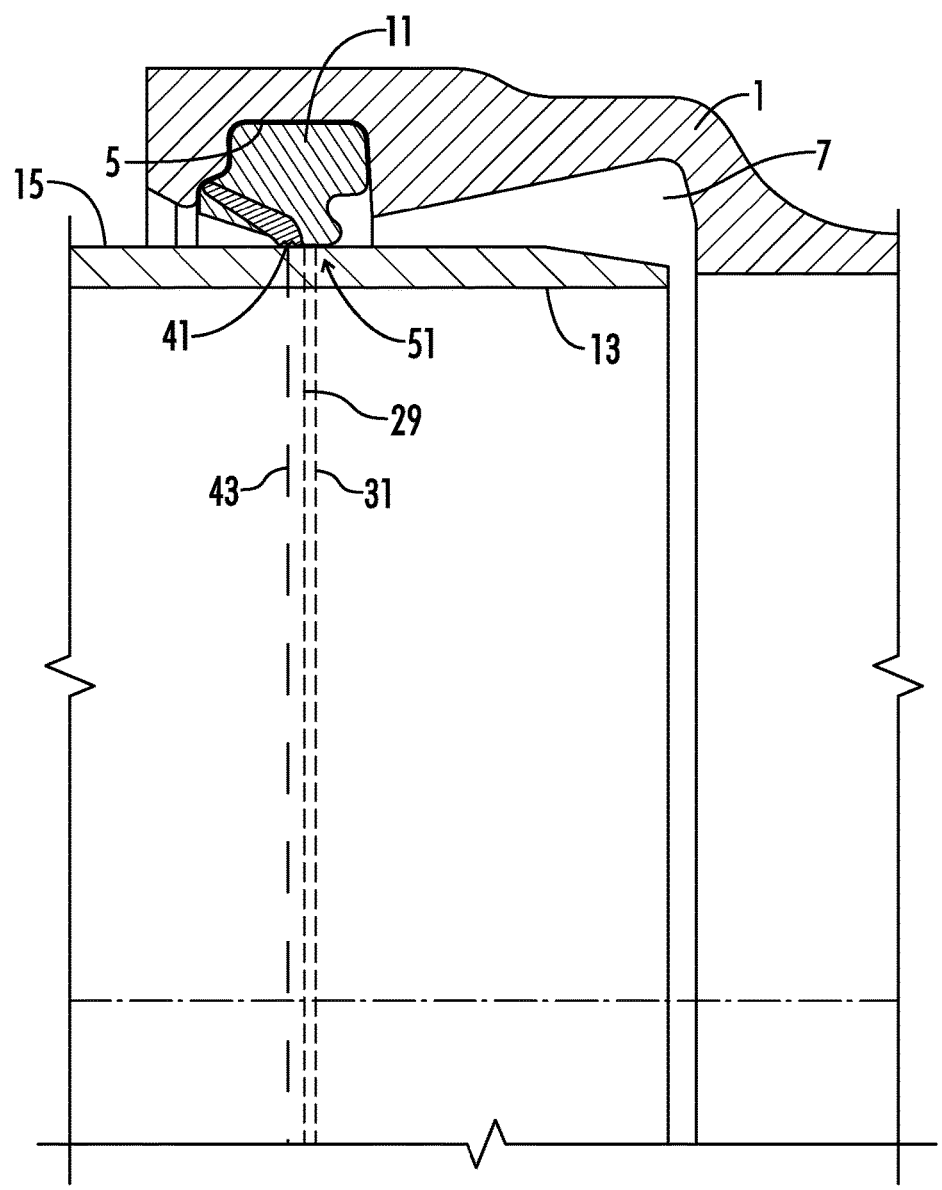
FIG. 10 depicts the spigot end of a second pipe fitted into the bell socket end of a first pipe, the pipes secured by a sealing member fitted within the bell socket with the pipes further secured by toothed restraints embedded in the inner surface of the sealing member, wherein the toothed restraints have impinged upon the spigot end upon pressurization of the joint.

Referring to FIG. 10, upon initial pressurization of the pipe joint, each of the restraints 17 impinges upon the spigot end 13 as pressurization of the pipes attempts to force the pipes apart. A ring of impingement points 41 is thereby formed about the exterior of the spigot end 13 as teeth of the restraints 17 dig into the exterior surface of spigot end 13. Additionally, an impingement plane 43 is formed that extends perpendicularly through the longitudinal axis of the first pipe at a third point 45 and through one or more of the impingement points 41, the third point 45 being a desired distance from the pivot point 27, the desired distance being 0% to 15% of the outer diameter of the spigot end 13.

In certain embodiments, the pipe joint described herein may be used for liquid supply pipes. For example, the pipe joint described herein may be used for piping applications including, but not limited to, water, liquid petroleum, and oil supply pipes and other like applications. In other embodiments, the pipe joint described herein may be used for gas supply pipes. For example, the pipe joint described herein may be used for piping applications including, but not limited to, natural gas supply pipes and other like applications.

A significant benefit of the pipe joint described herein is that such pipe joint allows the bell socket 1 to have significantly lowered mass compared with sockets used in conventional pipe joints capable of similar deflection angles. Further, the bell socket 1 contemplated herein does not require a conventional metal throat, thereby reducing weight and increasing casting tolerances for the bell socket 1. Further, the spigot end 13 of the second pipe 15 may slideably fit into the socket end 1 of the first pipe 3. These characteristics result in a lower cost bell socket 1 that is also easier to manufacture and install compared to conventional pipe joints.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The compositions of the various embodiments described herein are exemplary and are not intended to limit the interpretation of this disclosure. Various other embodiments for the pipe joints described herein are possible.

Now, therefore, the following is claimed:

1. A pipe joint comprising:
   a first pipe having a bell end and a longitudinal axis, the bell end including an annular groove,
   an annular compressible member located within the annular groove, the annular compressible member having an inner face defining an opening and a plurality of rigid restraints circumferentially embedded in the annular compressible member and extending through the inner face,
   a second pipe having a spigot end with an outer diameter, the second pipe being inserted into the bell end and through the opening and pivotable relative to the first pipe,
   an annular seal formed by and between the annular compressible member and the spigot end,
   a plurality of teeth extending radially inward from the plurality of rigid restraints, one or more teeth of the plurality of teeth impinging upon the spigot end of the second pipe thereby forming one or more impingement points,
   a pivot point about which the second pipe pivots relative to the first pipe, the pivot point being coincident with a pivot plane extending perpendicularly through the longitudinal axis of the first pipe and through the annular compressible member,
   an impingement plane that extends perpendicularly through the longitudinal axis of the first pipe at a second point and through the one or more impingement points, the second point being a first distance from the pivot point, the first distance being equal to 0.5% to 15% of the outer diameter of the spigot end, and a sealing plane that extends perpendicularly through the longitudinal axis of the first pipe at a third point and through a center of a width of the annular seal, the third point being a second distance from the pivot point, the second distance being equal to 0% to 15% of the outer diameter of the spigot end.

2. The pipe joint of claim 1 wherein the first distance is equal to 0.5% to 10% of the outer diameter of the spigot end.

3. The pipe joint of claim 1 wherein the first distance is equal to 0.5% to 5% of the outer diameter of the spigot end.

4. The pipe joint of claim 1 wherein the first distance is equal to 0.5% to 2% of the outer diameter of the spigot end.

5. The pipe joint of claim 1 wherein the second distance is equal to 0% to 5% of the outer diameter of the spigot end.

6. The pipe joint of claim 5 wherein the second distance is equal to 0% to 3% of the outer diameter of the spigot end.

7. The pipe joint according to claim 1 wherein the annular compressible member includes an annular channel extending along a proximal face thereof, the annular channel being configured for promoting a sealing portion of the gasket to compress axially when the spigot end is inserted through the opening.

8. The pipe joint according to claim 2 wherein the annular compressible member exhibits a hardness along the pivot plane that is greater than along the sealing plane.

9. A pipe joint comprising:
   a sealing member arranged between a first pipe and a second pipe, the sealing member including a restraint having teeth impinging upon an exterior surface of the first pipe at an impingement point and the restraint extending through the sealing member,
   a pivot point about which the first pipe is pivotally coupled to the second pipe, the pivot point being coincident with a longitudinal axis of the second pipe, and a pivot plane that extends through the pivot point and perpendicularly to the longitudinal axis of the second pipe, the pivot plane extending through the sealing member, an impingement plane that extends perpendicularly through the longitudinal axis of the second pipe at a second point and through the impingement point, the second point being a first distance from the pivot point, a sealing plane that extends perpendicularly through the longitudinal axis of the second pipe at a third point and through a width of an annular seal formed and defined by the sealing member and an exterior surface of the first pipe, the third point being a second distance from the pivot point, wherein the sealing plane extends through a center of the width of the annular seal, the width of the annular seal extends between a proximal most boundary and a distal most boundary of the annular seal, wherein the first distance is equal to 0% to 15% of an outer diameter of the first pipe along the pivot plane, and wherein the second distance is equal to 0% to 15% of an outer diameter of the first pipe along the pivot plane.

10. The pipe joint according to claim 9 wherein the first distance is equal to about 0.1% to about 2% of an outer diameter of the first pipe along the pivot plane and the second distance is equal to about 0.1% to about 2% of the outer diameter of the first pipe along the pivot plane.

11. The pipe joint according to claim 9 wherein the second pipe includes a bell end into which the first pipe is inserted.

12. The pipe joint according to claim 9 wherein the pivot plane and the impingement plane are coincident.

* * * * *